United States Patent
Oster et al.

(10) Patent No.: US 6,380,549 B1
(45) Date of Patent: Apr. 30, 2002

(54) DEVICE FOR DETECTING PIN-HOLES OR TEARS IN A FOIL

(75) Inventors: Heinz Oster, Feuerthalen; Patrik Zeiter, Zürich, both of (CH)

(73) Assignee: Alusuisse Technology & Management, Ltd. (CH)

( * ) Notice: Subject to any disclaimer, the term of this patent is extended or adjusted under 35 U.S.C. 154(b) by 0 days.

(21) Appl. No.: 09/295,598

(22) Filed: Apr. 22, 1999

(30) Foreign Application Priority Data

May 6, 1998 (EP) .............................................. 98810404

(51) Int. Cl.[7] .............................................. G01N 21/88
(52) U.S. Cl. ................................ 250/559.42; 356/237.6
(58) Field of Search ......................... 250/559.42, 559.4, 250/559.43, 559.45, 559.46, 221; 356/237.1, 237.6, 237.2, 239.1

(56) References Cited

U.S. PATENT DOCUMENTS 3,700,909 A * 10/1972 Murray et al. ......... 250/559.42

4,537,505 A * 8/1985 Bishop et al. ......... 250/559.42

FOREIGN PATENT DOCUMENTS

| EP | 0374735 | 6/1990 |
|----|---------|--------|
| EP | 0720906 | 5/1995 |

* cited by examiner

Primary Examiner—Kevin Pyo
(74) Attorney, Agent, or Firm—Fisher, Christen & Sabol

(57) ABSTRACT

In order to detect pin-holes or tears in a foil (16), during deformation of the foil (16), the transmission of light through the foil is measured continuously by means of at least one light source (22) situated on one side of the foil (16) and at least one of the light sensors (24) on the other side of the foil (16). The light source (22) is integrated in a shaping-punch (14) and the light sensors (24) are situated in a die (12) which is employed along with the punch (14). The pin-hole detector (10) enables pin-holes or tears formed during the deformation of the foil to be detected on-line in a single shaping step closely resembling actual working practice.

20 Claims, 1 Drawing Sheet

DEVICE FOR DETECTING PIN-HOLES OR TEARS IN A FOIL

The invention relates to a device for continuously detecting pinholes or tears in a foil during deformation of the foil, having a device for clamping the foil, a device for controlled deformation of the foil, at least one light source situated on one side of the foil, at least one light sensor on the other side of the foil for measuring the light penetrating the foil, and a device for continuously registering the light intensity measured by the light sensors.

In order to test foil-shaped materials for their tendency to form pin-holes or tears during shape-forming, the multi-axial stretch (MAS) test for example is employed. This method of testing is a stretch-draw test using a 27 mm diameter cylindrical Teflon punch (also called male forming die) and 30 mm diameter die. By plotting the force distance relationship during the deformation the depth at which fracture occurs is obtained as an expression of the formability of the foil being tested. In special cases, in addition to this test, the depth up to which the foil is free of pin-holes is determined. To that end, cups of increasing depth are prepared using the device employed for the MAS-test, and the first pin-holes subsequently detected by inspecting the cups visually using a light source. By investigating the deformation behaviour of various materials it has been found that there is not always direct correlation between depth at failure and depth at which the material is free of pin-holes.

It is also known to have a light-permeability pin-hole detector situated after the shape-forming station of production units manufacturing blister packs and other forms of foil packaging with recesses shape-formed in the foil.

Figure 2:
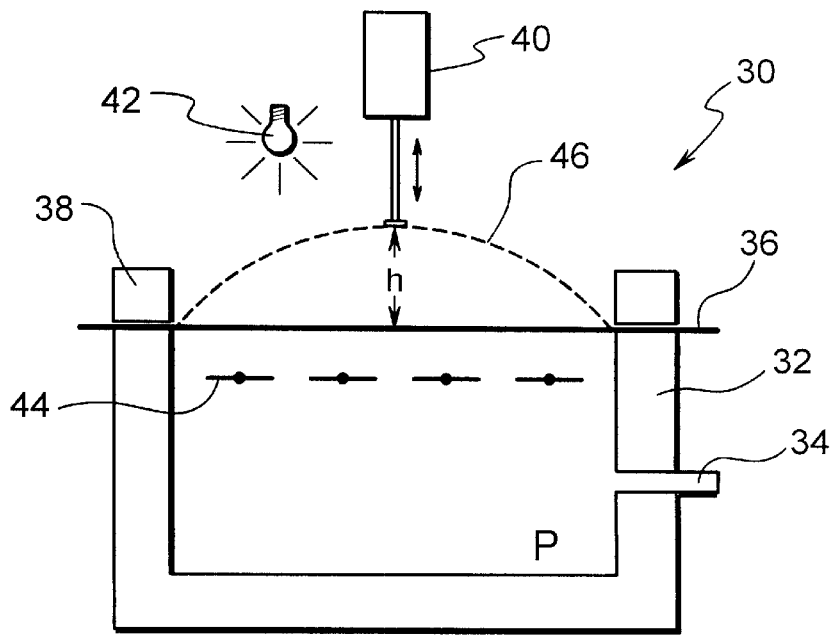

State-of-the-art technology includes a device of the kind described at the start illustrated in FIG. 2 in which the device for controlled deformation of the foil comprises a compressed gas device for applying to one side of the foil increasing gas pressure and a device to measure the degree of deformation continuously. With this device it is possible to detect pin-holes or tears directly as they are formed during the shape-forming of the foil. One significant disadvantage of this pin-hole detector is, however, that, because of the absence of friction during shape-forming with compressed gas, the flow behavior of the foil during deformation differs greatly from the actual flow behavior of foil deformed in practice using a shape-forming punch. For that reason, the knowledge of pin-hole formation and tearing gained from the compressed gas method can be applied only to a limited degree to the normal practice of shape-forming with a punch.

The object of the present invention is therefore to provide a device of the kind described at the start, which does not exhibit the disadvantages of the known pin-hole detectors and which leads to a deformation behaviour which corresponds to a large degree to the forming behaviour in practice.

That objective is achieved by way of the invention in that the device for controlled deformation of the foil comprises a punch which is situated on one side of the foil and is connected to a drive mechanism for deforming the foil, the light source or light sensors being integrated in the punch.

With the arrangement according to the invention in which the light source or the light sensors is/are situated within the punch, it is possible to copy the deformation with a shape-forming punch performed in practice.

The device according to the invention offers considerable advantages over the state of the art devices viz.:

using on-line testing for the light permeability of the foil, it is possible to detect the first pin-holes or tears and to observe the corresponding behaviour of the foil during sub-sequent deformation, this in a simple manner which is close to conditions in practice without visual testing of a series of samples in order to determine the pin-hole free depth in cups deformed to different depths.

the pin-holes are detected immediately as they form i.e. at a point in time in which the foil being subjected to deformation is under tensile stress. With the normal means of measurement the pin-hole free depth it is not possible to detect pin-holes so early as, under the absence of tensile force, these become so much smaller that they are no longer detectable visually. The same applies for a pin-hole detector situated after a shape-forming station.

A preferred version of the device according to the invention is such that at least shape-endowing region of the punch is of an easy-slide, light-permeable material, in particular of Teflon, whereby the light permeability of the punch surface may be increased further by use of a porous material or by micro-perforation.

The easy-slide material may be deposited on the shaping punch as a coating. In a particularly useful version the punch is, however, in the form of a thin-walled hollow body with light-permeable wall.

In a particularly preferred version of the device according to the invention the shaping punch faces a die serving as a black chamber and the light sensors are situated in the die.

The device according to the invention may be employed not only for material testing purposes but is also suitable for use in industrial production units employed for the production of foils with recesses, for example blister packs.

The device according to the invention can supplement or replace the present day pin-hole detector normally installed after the shape-forming station. As the shaping punch fitted with a light source can be employed to manufacture recesses e.g. in blister manufacture and—along with light sensors in the die of a shaping station—as a pin-hole detector, it is possible to obtain optimal control of the deformation process.

A special area for using the process or device according to the invention is in the testing of foils that are non-permeable to light, in particular foil laminates of plastic and metal or metal foils, preferably foil laminates part of which is of aluminium or aluminium foils.

Figure 1:
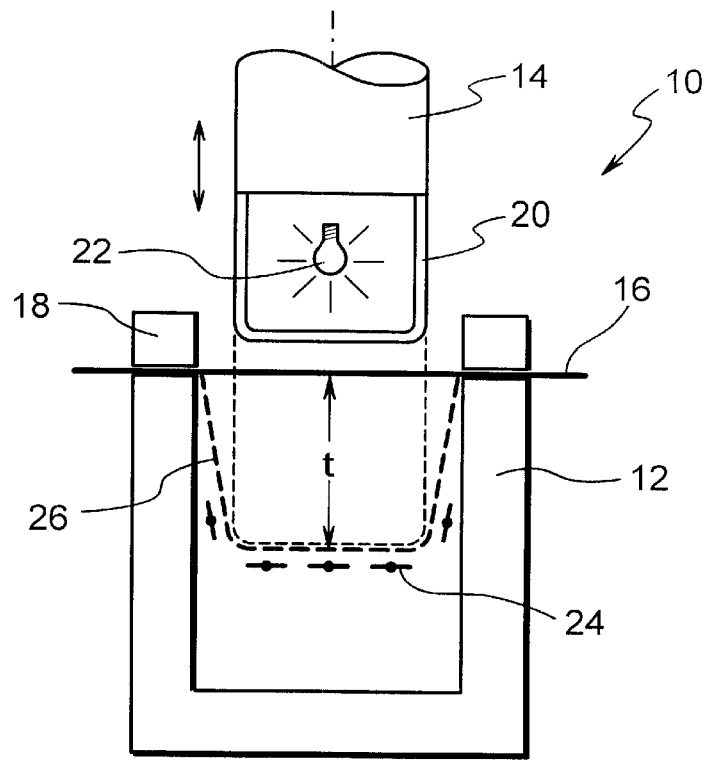

Further advantages, features and details of the invention are revealed by way of the following description of a preferred exemplified embodiment of the invention compared with the state of the art and with the aid of the drawing which shows in:

FIG. 1 a partially sectioned side view of a pin-hole detector with shaping punch and die:

FIG. 2 a partially sectioned side view of a state of the art pin-hole detector.

A pin-hole detector 10 shown in FIG. 1 features a die 12 serving as a black chamber and a shaping punch 14 which is employed along with the die. A clamping tool 18 serves to hold a foil 16 in place at the edge of the die 12.

The shaping part of the punch 14 is in the form of a hollow body with a light-permeable wall 20. In the interior of the punch 14 is a light source 22. Light sensors 24 are provided in the die 12.

By way of example of a foil 16 which has to be tested a laminate comprising an aluminium foil clad on both sides with a plastic film of the following make up has proved itself in the production of blister packs:

Plastic Film oriented polyamide, 25 μm thick
aluminium, 45 μm thick
PVC, 60 μm thick The shaping part of the punch 14 is for example a punch of Teflon which has been machined down to the remaining wall 20. A light emitting diode (LED) serves as an especially good light source. The number and arrangement of the light sensors 24 in the die 12 is selected according to the requirements of the testing method. For example twelve light sensors may be arranged such that they lie opposite the most heavily deformed part of a cup 26 shaped from the foil 16 during the test.

The manner in which the pin-hole detector 10 functions is explained in the following.

A foil is laid on the edge of the die 12 and fixed to the die 12 by means of the clamp 18. The shaping punch 16 with integral light source 22 is brought up against the foil 16 and pushed into the die by means of a drive mechanism which is not shown here. As a result a cup 26 is shaped from the foil 16. As soon as pin-holes or tears occur at critical places, the light from the light source 22 shines through the foil 16 into the die 12, where the light impinging on the light sensors 24 is measured. The advancement of the punch 14 or the depth t of the cup 26 formed from the foil 16 is registered via the drive for the punch and converted to electrical signals which, together with the electrical signals generated by the light sensors 24, are communicated in a standard manner to a registration unit which is not shown here. The continuous registration of light intensity measured by the light sensors 24 as a function of the degree of deformation of the cup 26 formed from the foil 16—represented by the depth t—enables the pin-holes or tears to be detected directly during their actual formation. So for example, the first signal from the light sensors 24 indicates the occurrence of the first pin-hole. By appropriate modification of the software the formation of the pin-holes can be displayed—in any manner required for evaluation—as a function of the degree of deformation of the foil.

FIG. 2 shows a state of the art pin-hole detector 30 with a pressure chamber 32 with compressed air connection 34. A clamp 38 serves to hold down at the edge of the pressure chamber 32 a foil 36 that is to be tested. Outside the pressure chamber 32 is a displacement sensor 40 that rests against the foil 36. Also outside the pressure chamber 36 and above the foil 36 is a light source 42. Light sensors 44 are arranged inside the pressure chamber 32.

The manner in which the pin-hole detector 30 functions is explained briefly in the following.

By continuously increasing the gas pressure p inside the pressure chamber 32 the foil 36 which is held down by the clamp 38 is made to form a bulge. The height h of the bulge is measured by the displacement sensor 40 and converted into electrical signals. As soon as pin-holes or tears form in the foil 36 light from the light source 42 passes through the foil 36 into the pressure chamber 32 and impinges on the light sensors 44 there which measure the intensity of light and converts this into electrical signals. The registration of the light intensity measured by the light sensors and evaluation as a function of the stretching of the foil via the bulge height h is performed in the same way as above with the pin-hole detector with die and shaping punch. As was already mentioned, this state of the art pin-hole detector suffers the significant disadvantage of the stretching process being very different from that experienced in practice, with the result it is hardly possible to make a qualitative statement about the occurrence of pin-holes or tears under practical operating conditions.

The pin-hole detector shown in FIG. 1 may be employed in free-standing test equipment for quality control purposes or in the development of foil laminates. Further, it is also possible to integrate pin-hole detectors directly in a production unit for manufacturing e.g. blister packs, as the shaping punch with integral light source serves simultaneously as shaping tool and pin-hole detector. This way the process parameters of the shaping equipment for blister manufacture can be set to their optimal values.

Although the pin-hole detector shown in FIG. 1 features a clamp and consequently the shaping of the foil is performed by stretch drawing, variations are possible in which the foil is shaped by other shaping methods e.g. by deep drawing.

What is claimed is:

1. Device for continuously detecting pinholes or tears in a foil (16) during deformation of the foil (16), comprising a device (12, 18) for clamping the foil (16), a device (14) for controlled deformation of the foil (16), at least one light source (22) situated on one side of the foil (16), at least one light sensor (24) on the other side of the foil (16) for measuring the light penetrating the foil (16,), and a device for continuously registering the light intensity measured by the light sensors (24), the device for controlled deformation of the foil (16) comprises a punch (14) which is situated on one side of the foil (16) and is connected to a drive mechanism for deforming the foil (16), the light source (22) or light sensors (24) being integrated in the punch (14).

2. Device according to claim 1, characterized in that the light source (22) is integrated in the punch (14) and at least shape-forming surface area of the punch (14) is of an easy-slide, light-permeable material.

3. Device according to claim 2, characterised in that the light permeability of the punch surface is increased by use of a porous material or by micro-perforations.

4. Device according to claim 2, characterised in that the easy-slide material is deposited as a coating on the punch (14).

5. Device according to claim 2, characterised in that the punch (14) is in the form of a thin-walled hollow body with light-permeable wall (20).

6. Device according to claim 1, characterized in that the punch (14) faces a die (12) and the light sensors (24) are situated in the die (12).

7. Device according to claim 2, wherein the easy-slide material is deposited as a coating on the punch (14).

8. The device according to claim 2, wherein the easy-slide, light-permeable material is polytetrafluorethylene.

9. Device according to claim 3, characterized in that the punch (14) is in the form of a thin-walled hollow body with light-permeable wall (20).

10. Device according to claim 9, characterized in that the punch (14) faces a die (12) and the light sensors (24) are situated in the die (12).

11. A process comprising forming a depression in the foil (16) by means of the device of claim 10.

12. A process comprising forming a depression in the foil (16) by means of the device of claim 10 to provide a blister pack.

13. A process comprising testing a foil that is non-permeable to light for any pin-hole or tear in the foil by means of the device of claim 10.

14. A process comprising testing a foil that is non-permeable to light and that is a metal foil or a foil laminate of plastic and metal, for any pin-hole or tear in the foil by means of the device of claim 10.

15. A process comprising testing a foil that is non-permeable to light and that is a foil laminate part of which is an aluminum foil or aluminum foils, for any pin-hole or tear in the foil by means of the device of claim 10.

16. A process comprising forming a depression in the foil (16) by means of the device of claim 1.

17. A process comprising forming a depression in the foil (16) by means of the device of claim 1 to provide a blister pack.

18. A process comprising testing a foil that is non-permeable to light for any pin-hole or tear in the foil by means of the device of claim 1.

19. A process comprising testing a foil that is non-permeable to light and that is a metal foil or a foil laminate of plastic and metal, for any pin-hole or tear in the foil by means of the device in claim 1.

20. A process comprising testing a foil that is non-permeable to light and that is a foil laminate part of which is an aluminum foil or aluminum foils, for any pin-hole or tear in the foil by means of the device of claim 1.

* * * * *